Aug. 18, 1925.  1,550,622
E. Z. LESH
LOAD RELEASING SHACKLE FOR AIRCRAFT
Filed June 9, 1923
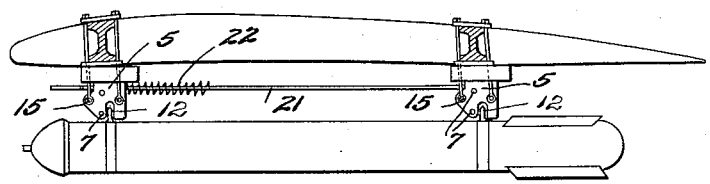
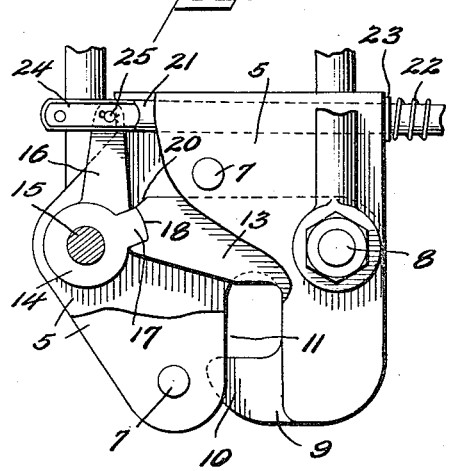
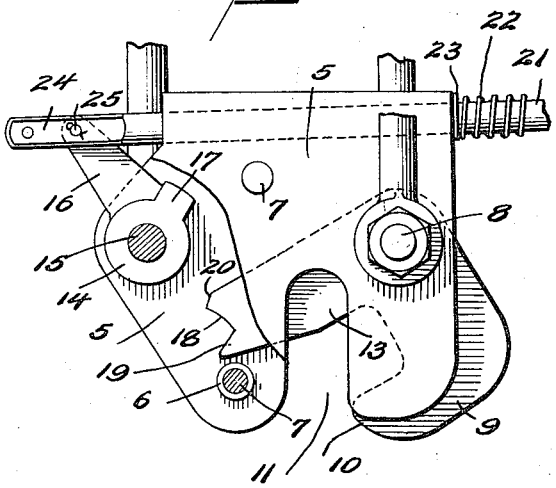
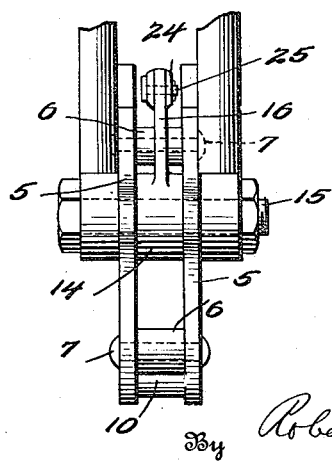
Inventor
Edwin Z. Lesh
By Robert A. Young
Attorney Patented Aug. 18, 1925.

1,550,622

UNITED STATES PATENT OFFICE.

EDWIN Z. LESH, OF DAYTON, OHIO.

LOAD-RELEASING SHACKLE FOR AIRCRAFT.

Application filed June 9, 1923. Serial No. 644,456.

*To all whom it may concern:*

Be it known that I, EDWIN Z. LESH, a citizen of the United States, residing at Dayton, in the county of Montgomery and State of Ohio, have invented certain new and useful Improvements in Load-Releasing Shackles for Aircraft, of which the following is a specification.

This invention relates to shackles for suspending heavy loads such as bombs and the like from an aircraft.

In carrying on an aircraft and releasing therefrom heavy loads such as large bombs and other heavy and bulky objects, it is often advantageous to suspend such object from two points by the use of two separate shackles or releasing mechanisms, as otherwise a prohibitive framework would be necessary to connect and brace the two points of suspension.

The object of the present invention is, therefore, to provide practical means whereby a heavy body or object such as a bomb may be suspended from and beneath an aircraft and released therefrom by a single operating connection or element extending between the points of suspension. The improved releasing shackle herein fully described and shown differs from the ordinary bomb dropping shackles heretofore used in that the weight of the bomb is suspended between two rods or bolts thereby affording direct suspending connection between the bomb and airplane, the shackless serving to maintain the bomb in the best position in relation to the airplane, and the particular design and construction of the shackle mechanism greatly facilitating the incorporation of the necessary strength to carry heavy loads.

With the above and other objects in view, the invention consists in the novel construction, combination and arrangement herein shown, described and claimed.

In the accompanying drawings:

Figure 1 is a side elevation showing the use of two shackles and the relation thereof to an airplane and to a bomb suspended thereon.

Figure 2 is an enlarged side elevation of one of the shackles, partly broken away and showing the hook in bomb supporting position.

Figure 3 is also a side elevation of the shackle partly broken away and showing the hook in bomb releasing position.

Figure 4 is an edge view of the shackle taken at a right angle to Figures 2 and 3.

Each shackle in a perfect embodiment thereof, embodies two side plates 5 which are held at a certain distance apart by means of spacing sleeves 6 through which are inserted rivets 7, such rivets also passing through the plates 5 and serving to rigidly connect all of said parts together.

Extending through the two side plates 5 is a bolt forming a pivot 8 upon which is mounted for pivotal movement a load supporting hook 9, the supporting lip 10 of which is adapted to extend across notches 11 extending upwardly from the bottom edges of the plates 5 to receive one of the lugs on the bomb indicated at 12.

The hook 9 is formed with a locking arm 13 which is movable between the plates 5 and adapted to be engaged, held and locked by means of a detent 14. The detent 14 is mounted fast upon a short rock shaft 15 supported by plates 5 and is operated by means of a crank arm 16. The detent 14 has a radially projecting lip 17 which is received in a recess 18 in the locking arm 13 of the hook 9. The arm 13 is formed with a rest shoulder 19 for the lip 17 and is also formed with a camming surface 20 which, as the arm 13 is moved upwardly by the lug on the bomb, as the bomb is fitted into place on the shackle, rides against the lip 17 thereby imparting a turning movement to the detent before the lip 17 is forced into the locking notch or recess 18 by means to be described.

By reference to Figure 1, it will be observed that the bomb is supported at two points by the hooks 9 of the two shackles therein shown. The hooks 9 are simultaneously released by the operation of a single rod 21 preferably of tubular formation as shown for the sake of lightness, said rod being normally held against accidental movement by means of a spring 22 encircling the rod 21 and having one end fixed in relation to the rod 21, the other end of the spring bearing against the plate or washer 23 through which the rod 21 is slidable. The rod 21 carries a clevis 24 connected by a pivot 25 to the operating arm 16 of the detent. The spring 22 acts to hold the lip 17 in locking engagement with the arm 13 of the hook 9. When the rod 21 is, however, slid to the left in Figures 2 and 3, the lip 17 is moved out of engagement with the recess 18 thereby releasing the hook 9 and permitting said hook to swing downwardly to release the bomb. Both of the hooks 9 are thus simultaneously released by the operation of a single element (rod) 21.

In placing the bomb in engagement with the shackles, the lugs or eyes on the bomb are pushed upwardly into the notches 11, where they act to push upwardly on the locking arms 13. The arms 13 in turn exert a camming action on the detents 14 until finally the lips 17 are forced into the recesses 18 of the arms 13 by the action of the spring 22 on the rod 21 and the operating arms 16 of the detents 14.

I claim:—

1. A bomb-releasing shackle embodying a frame, a bomb-supporting hook pivotally supported thereby, suspending rods directly supporting the pivot for said hook on opposite sides of said hook, a detent for locking said hook in bomb-supporting position, and means for shifting said detent to release the hook.

2. A bomb-releasing shackle embodying a frame, a bomb-supporting hook pivotally supported thereby, suspending rods directly supporting the pivot for said hook on opposite sides of said hook, a spring pressed detent for locking said hook in bomb-supporting position, and means for shifting said detent to release the hook.

3. A bomb-releasing shackle embodying a frame, a bomb-supporting hook pivotally supported thereby, suspending rods directly supporting the pivot for said hook on opposite sides of said hook, a detent for locking said hook in bomb-supporting position, said detent having an operating arm, and an operating rod having connection with said arm.

4. A bomb-releasing shackle embodying a frame, a bomb-supporting hook pivotally supported thereby, a pivot for said hook, direct suspension means between said pivot and an aircraft, and means for locking and releasing said hook.

5. A bomb-releasing shackle embodying a frame, a bomb-supporting hook pivotally supported thereby, a pivot for said hook, suspension rods directly supporting said pivot on opposite sides of the hook, and locking and releasing means for said hook.

6. A bomb-releasing shackle embodying a frame, a bomb-supporting hook pivotally supported thereby and having a locking arm, suspending rods directly supporting the pivot of said hook on opposite sides thereof a detent movable into and out of locking engagement with said arm, and means for moving said detent to release said hook.

7. A bomb-releasing shackle embodying a frame, a self-cocking bomb-supporting hook pivotally supported thereby, suspending rods directly supporting the pivot of said hook on opposite sides of said hook, a detent for locking said hook in bomb-supporting position, and means for shifting said detent to release the hook.

8. A self-cocking bomb-releasing shackle embodying a frame, a bomb-supporting hook pivotally supported thereby, suspension rods directly supporting the pivot of said hook on opposite sides of said hook, a yieldably sustained detent adapted to automatically lock said hook when the latter is moved to its bomb-supporting position, and means for operating said detent to release the hook.

9. Multiple point suspension means for the purpose described, embodying a plurality of shackle units arranged at the suspension points and each having a movable load-carrying hook, a pivot for each of said hooks, direct suspension elements between said pivots and an aircraft, means for locking said hooks, and means for simultaneously releasing the hooks.

10. A bomb-releasing shackle for aircraft including a frame, a bomb-supporting hook pivotally supported thereby, and direct suspension means between the aircraft and the pivot of said hook, said means engaging the pivot of said hook on the outside of said frame.

In testimony whereof I affix my signature.

EDWIN Z. LESH.